(12) United States Patent
Chun et al.

(10) Patent No.: US 8,897,159 B2
(45) Date of Patent: Nov. 25, 2014

(54) METHOD AND APPARATUS FOR TRANSMITTING FEEDBACK INFORMATION IN A WIRELESS COMMUNICATION SYSTEM CONTAINING A RELAY STATION

(75) Inventors: Jin Young Chun, Anyang-si (KR); Su Nam Kim, Anyang-si (KR); Jin Sam Kwak, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 13/514,001

(22) PCT Filed: Dec. 9, 2010

(86) PCT No.: PCT/KR2010/008787
§ 371 (c)(1),
(2), (4) Date: Jun. 5, 2012

(87) PCT Pub. No.: WO2011/074828
PCT Pub. Date: Jun. 23, 2011

(65) Prior Publication Data
US 2012/0250560 A1    Oct. 4, 2012

Related U.S. Application Data

(60) Provisional application No. 61/287,707, filed on Dec. 18, 2009.

(30) Foreign Application Priority Data

Nov. 30, 2010   (KR) ..................... 10-2010-0120148

(51) Int. Cl.
| | |
|---|---|
| H04J 3/14 | (2006.01) |
| H04W 72/08 | (2009.01) |
| H04L 5/00 | (2006.01) |
| H04B 7/155 | (2006.01) |
| H04W 16/02 | (2009.01) |
| H04W 72/00 | (2009.01) |
| H04W 84/04 | (2009.01) |
| H04W 24/10 | (2009.01) |

(52) U.S. Cl.
CPC ............ *H04W 72/085* (2013.01); *H04W 16/02* (2013.01); *H04W 72/00* (2013.01); *H04L 5/0053* (2013.01); *H04W 84/047* (2013.01); *H04L 5/0055* (2013.01); *H04L 5/0007* (2013.01); *H04W 24/10* (2013.01); *H04B 7/155* (2013.01)
USPC ........................................ 370/252; 455/509

(58) Field of Classification Search
USPC ........................... 370/252; 375/260; 455/509
See application file for complete search history.

(56) References Cited

U.S. PATENT DOCUMENTS

| | | | |
|---|---|---|---|
| 2009/0028260 A1* | 1/2009 | Xiao et al. | .................. 375/260 |
| 2011/0034198 A1* | 2/2011 | Chen et al. | .................. 455/509 |

FOREIGN PATENT DOCUMENTS

| | | |
|---|---|---|
| WO | WO 2009/028819 | 3/2009 |
| WO | WO 2009/096708 | 8/2009 |
| WO | WO 2009/131225 | 10/2009 |

*Primary Examiner* — Albert T Chou
(74) *Attorney, Agent, or Firm* — Mckenna Long & Aldridge LLP

(57) ABSTRACT

Provided are a method and apparatus for transmitting feedback information in a wireless communication system containing a relay station. A subband is divided by a plurality of partitions, and the relay station measures feedback information for each of the partitions, and transmits feedback information measured for each of the partitions cyclically at a predetermined interval. Each partition can be a physical resource unit (PRU), and one PRU contains 18 subcarriers. Feedback information for each partition can be cyclically transmitted in the order fixed in the subband.

6 Claims, 8 Drawing Sheets

METHOD AND APPARATUS FOR TRANSMITTING FEEDBACK INFORMATION IN A WIRELESS COMMUNICATION SYSTEM CONTAINING A RELAY STATION

This application is a 35 U.S.C. §371 National Stage entry of International Application No. PCT/KR2010/008787, filed on Dec. 9, 2010, and claims the benefit of U.S. Provisional Application Nos. 61/287,707, filed Dec. 18, 2009, and Korean Patent Application No. 10-2010-0120148, filed Nov. 30, 2010, all of which are incorporated by reference in their entirety herein.

BACKGROUND OF THE INVENTION

1. Field of the Invention

The present invention relates to wireless communications, and more particularly, to a method and apparatus for feedback transmission in a wireless communication system employing a relay station.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

A user equipment (UE) may transmit a feedback through uplink. The feedback may include channel information necessary for data transmission. A base station (BS) may schedule radio resources using the feedback received from the UE and transmit data. A closed loop scheme is a scheme of transmitting data by compensating for channel information included in a feedback from UE, and an open loop scheme is a scheme of transmitting data by not compensating for channel information included in a feedback from UE. A feedback may not be transmitted according to the open loop scheme, and a BS may do not use channel information included in a feedback although the channel information is included in the feedback. In general, in a wireless communication system, the open loop scheme may be applied to a channel environment for UE that moves at high speed, and the closed loop scheme may be applied to a channel environment for UE that moves at low speed. The open loop scheme is applied to a channel for UE that moves at high speed because the channel is greatly changed, making channel information, included in a feedback, difficult to be reliable. The closed loop scheme may be applied to a channel environment for UE that moves at low speed because the channel environment is relatively less changed and channel information included in a feedback is reliable and less sensitive to delay.

A wireless communication system including a relay station (RS) has recently been developed. The RS is employed for cell coverage extension and transmission capability improvement. A BS provides a service to an MS located in a coverage boundary of the BS via the RS, and thus can obtain an effect of extending the cell coverage. In addition, the RS improves signal transmission reliability between the BS and the MS, thereby improving transmission capacity. The RS can be used when the MS is located in a shadow area even if the MS is located within the coverage of the BS.

In a wireless communication system employing a relay station, the relay station can also transmit an uplink feedback to a base station. Meanwhile, since the base station and the relay station have fixed positions in general, there is a high possibility that link quality between the base station and the relay station is better than link quality between the base station and a user equipment. Therefore, as an uplink feedback transmission method of the relay station, a new method different from the conventional uplink feedback transmission method of the user equipment can be introduced.

There is a need to propose a method for effective uplink feedback transmission of the relay station.

SUMMARY OF THE INVENTION

The present invention proposes a method and apparatus for feedback transmission in a wireless communication system employing a relay station.

In an aspect, a method of transmitting feedback information by a relay station in a wireless communication system employing the relay station is provided. The method includes measuring the feedback information in unit of each partition by dividing a subband into a plurality of partitions, and transmitting alternately the measured feedback information for each partition according to a specific period.

Each partition may be one physical resource unit (PRU). The PRU may include 18 subcarriers.

The feedback information for each partition may be cyclically and alternately transmitted in the order of the subband.

The feedback information may include at least one of a channel quality indicator (CQI) and a precoding matrix indicator (PMI).

A unit of feedback measurement may be determined by a message transmitted by the relay station.

The method may further include receiving a feedback allocation advanced-MAP information element (IE) from a base station. A unit of feedback measurement may be determined by an ARS_Feedback_Mode field in the feedback allocation A-MAP IE.

In another aspect, an apparatus for transmitting feedback information is provided. The apparatus includes a processor configured to measure the feedback information in unit of a plurality of partitions constituting a subband, and a radio frequency (RF) unit coupled to the processor and configured to alternately transmit the measured feedback information for each partition according to a specific period.

Each partition may be one physical resource unit (PRU). The PRU may include 18 subcarriers.

The feedback information for each partition may be cyclically and alternately transmitted in the order of the subband.

The feedback information may include at least one of a channel quality indicator (CQI) and a precoding matrix indicator (PMI).

The RF unit may further configured to receive a feedback allocation advanced-MAP information element (IE) from a base station. A unit of feedback measurement may be determined by an ARS_Feedback_Mode field in the feedback allocation A-MAP IE.

A wireless communication system employing a relay station performs feedback in unit of a physical resource unit (PRU) without significant changes in the conventional subband-based feedback structure, thereby improving feedback performance.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
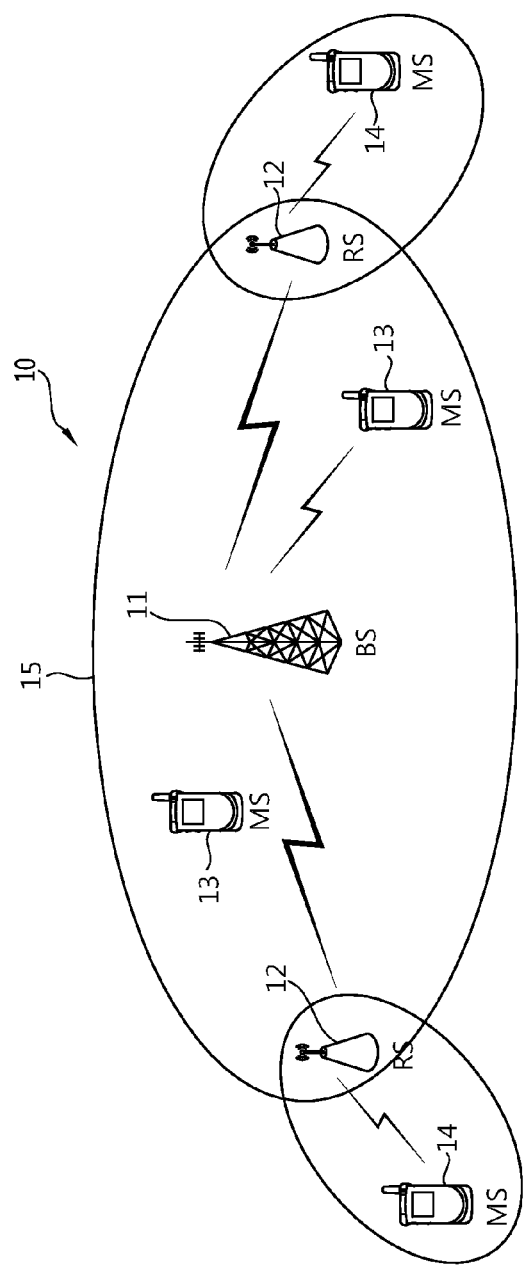
FIG. 1 shows a wireless communication system including a relay station.

FIG. 1 shows a wireless communication system including a relay station.

Referring to FIG. 1, a wireless communication system 10 including a relay station (RS) 12 includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a mobile station (MS) 13 and may be referred to as another terminology, such as an evolved node-B (eNB), a base transceiver system (BTS), an access point, an access network (AN), an advanced BS (ABS), etc. The BS 11 can perform functions such as connectivity between the RS 12 and an MS 14, management, control, resource allocation, etc.

The RS 12 is a device for relaying a signal between the BS 11 and the MS 14, and is also referred to as another terminology such as a relay node (RN), a repeater, an advanced RS (ARS), etc. A relay scheme used in the RS may be either amplify and forward (AF) or decode and forward (DF), and the technical features of the present invention are not limited thereto.

The MSs 13 and 14 may be fixed or mobile, and may be referred to as another terminology, such as a an advanced mobile station (AMS), a user terminal (UT), a subscriber station (SS), a wireless device, a personal digital assistant (PDA), a wireless modem, a handheld device, an access terminal (AT), a user equipment (UE), etc. Hereinafter, a macro MS denotes an MS that directly communicates with the BS 11, and a relay MS denotes an MS that communicates with the RS. To improve a data transfer rate depending on a diversity effect, a macro MS 13 located in the cell of the BS 11 can also communicate with the BS 11 via the RS 12.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). Between the BS and the macro MS, a downlink (DL) denotes communication from the BS to the macro MS, and an uplink (UL) denotes communication from the macro MS to the BS. Between the BS and the RS, a DL denotes communication from the BS to the RS, and a UL denotes communication from the RS to the BS. Between the RS and the relay MS, a DL denotes communication from the RS to the relay MS, and a UL denotes communication from the relay MS to the RS. In DL, a transmitter may be a part of the BS or the RS, and a receiver may be a part of the MS or the RS. In UL, a transmitter may be a part of the MS or the RS, and a receiver may be a part of the BS or the RS.

Figure 2:
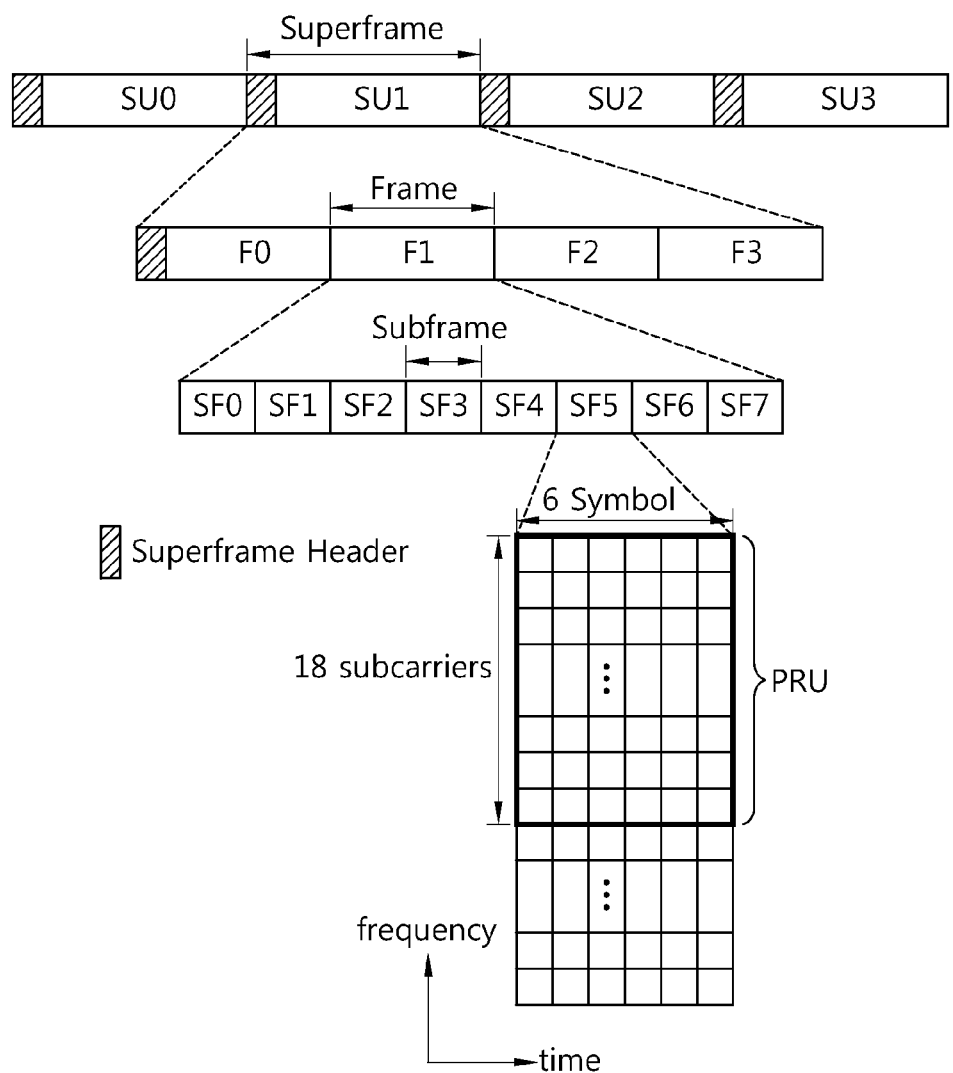
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) may carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH may be transmitted in every superframe. The S-SFH may be transmitted in two consecutive superframes. Information transmitted on the S-SFH may be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP2 includes information on initial network entry and network discovery. The S-SFH SP3 includes other important system information.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, Fs(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf(kHz) | | | 10.94 | 7.81 | 9.77 | 10.94 | 10.94 |
| Useful symbol time Tb(μs) | | | 91.4 | 128 | 102.4 | 91.4 | 91.4 |
| G = 1/8 | Symbol time, Ts(μs) | | 102.857 | 144 | 115.2 | 102.857 | 102.857 |
| | FDD | Number of OFDMA symbols per 5 ms frame | 48 | 34 | 43 | 48 | 48 |
| | | Idle time(μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, Ts(μs) | | 97.143 | 136 | 108.8 | 97.143 | 97.143 |
| | FDD | Number of OFDMA symbols per 5 ms frame | 51 | 36 | 45 | 51 | 51 |
| | | Idle time(μs) | 45.71 | 104 | 104 | 45.71 | 45.71 |

TABLE 1-continued

|  |  |  |  |  |  |  |  |
|---|---|---|---|---|---|---|---|
|  | TDD | Number of OFDMA symbols per 5 ms frame | 50 | 35 | 44 | 50 | 50 |
|  |  | TTG + RTG(μs) | 142.853 | 240 | 212.8 | 142.853 | 142.853 |
| G = 1/4 |  | Symbol time, Ts(μs) | 114.286 | 160 | 128 | 114.286 | 114.286 |
|  | FDD | Number of OFDMA symbols per 5 ms frame | 43 | 31 | 39 | 43 | 43 |
|  |  | Idle time(μs) | 85.694 | 40 | 8 | 85.694 | 85.694 |
|  | TDD | Number of OFDMA symbols per 5 ms frame | 42 | 30 | 38 | 42 | 42 |
|  |  | TTG + RTG(μs) | 199.98 | 200 | 136 | 199.98 | 199.98 |
| Number of Guard subcarriers | Left |  | 40 | 80 | 80 | 80 | 160 |
|  | Right |  | 39 | 79 | 79 | 79 | 159 |
| Number of used subcarriers |  |  | 433 | 865 | 865 | 865 | 1729 |
| Number of PRU in type-1 subframe |  |  | 24 | 48 | 48 | 48 | 96 |

In Table 1, $N_{FFT}$ denotes a smallest power of 2 greater than $N_{used}$. A sampling factor is defined as $F_s$=floor(n·BW/8000)× 8000. A subcarrier spacing is defined as $\Delta f = F_s/NFFT$. A useful symbol time is defined as $Tb=1/\Delta f$. A CP time is defined as $Tg=G\cdot Tb$. An OFDMA symbol time is defined as $Ts=Tb+Tg$. A sampling time is defined as Tb/NFFT.

Figure 3:
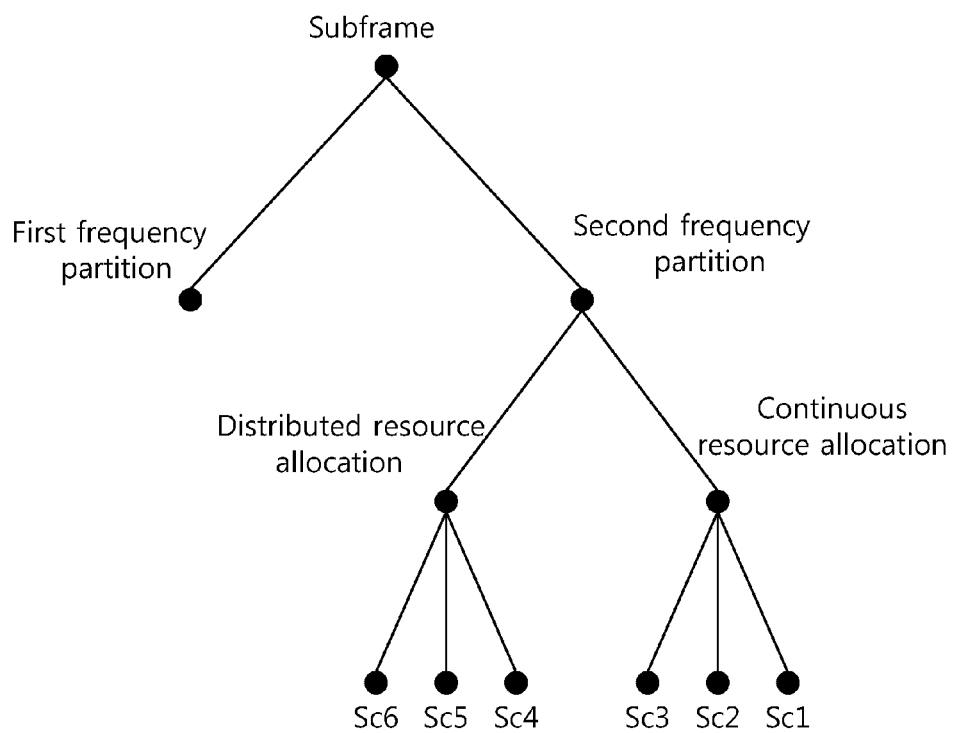
FIG. 3 shows an example of an uplink resource structure.

FIG. 3 shows an example of an uplink resource structure.

Each uplink subframe can be divided into 4 or less frequency partitions. Although a subframe is divided into two frequency partitions (i.e., FP1 and FP2) in FIG. 3, this is for exemplary purposes only, and thus the number of frequency partitions in the subframe is not limited thereto. Each frequency partition consists of at least one physical resource unit (PRU) across all available orthogonal frequency division multiple access (OFDMA) symbols in the subframe. In addition, each frequency partition may include contiguous/localized and/or distributed RRUs. Each frequency partition may be used for other purposes such as fractional frequency reuse (FFR). The FP2 of FIG. 3 includes both contiguous resource allocation and distributed resource allocation. 'Sc' denotes a subcarrier.

The PRU is a basic physical unit for resource allocation, and includes Psc contiguous subcarriers and Nsym contiguous OFDMA symbols. Psc may be 18. Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations.

A distributed logical resource unit (DLRU) can be used to obtain a frequency diversity gain. The DLRU includes a group of subcarriers distributed in one frequency partition. A minimum unit of constituting the DLRU may be a tile. An uplink DLRU may include a group of subcarriers distributed from 3 tiles. The tile may be defined as 6 subcarriers and Nsym OFMDA symbols.

A contiguous logical resource unit (CLRU) can be used to obtain a frequency selective scheduling gain. The CLRU includes a group of contiguous subcarriers in a resource allocated in a localized manner. The CLRU consists of a data subcarrier in a contiguous resource unit (CRU). The CRU has the same size as the PRU.

When a plurality of cells exists, an uplink resource may be mapped by performing various processes such as subband partitioning, miniband permutation, frequency partitioning, etc. Such a process can be called a subchannelization process.

Figure 4:
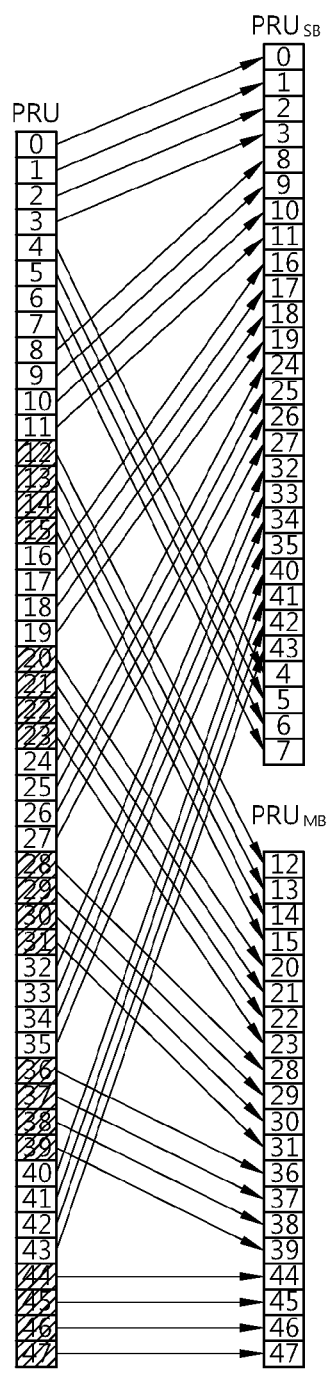
FIG. 4 shows an example of a subband partitioning process.

FIG. 4 shows an example of a subband partitioning process. A bandwidth of 10 MHz is used in the subband partitioning process of FIG. 4.

A plurality of PRUs is divided into a subband (SB) and a miniband (MB). The SB includes N1 contiguous PRUs, and the MB includes N2 contiguous PRUs. In this case, N1 may be 4 and N2 may be 1. The SB is suitable for frequency selective resource allocation since it provides contiguous allocation of PRUs in a frequency domain. The MB is suitable for frequency diverse resource allocation and may be permutated in the frequency domain.

The number of SBs can be denoted by $K_{SB}$. The number of PRUs allocated to the SBs can be denoted by $L_{SB}$, where $L_{SB}=N1*K_{SB}$. The $K_{SB}$ may vary depending on a bandwidth. $K_{SB}$ may be determined by an uplink subband allocation count (USAC). A length of the USAC may be 3 to 5 bits, and may be broadcast through the SFH, etc. PRUs remaining after being allocated to the SBs are allocated to MBs. The number of MBs can be denoted by $K_{MB}$. The number of PRUs allocated to the MBs can be denoted by $L_{MB}$, where $L_{MB}=N2*K_{MB}$. The total number of PRUs is $N_{PRU}=L_{SB}+L_{MB}$.

A plurality of PRUs is divided into a subband (SB) and a miniband (MB), and is reordered in an SB PRU ($PRU_{SB}$) and an MB PRU ($PRU_{MB}$). PRUs in the $PRU_{SB}$ are respectively indexed from 0 to ($L_{SB}-1$). PRUs in the $PRU_{MB}$ are respectively indexed from 0 to ($L_{MB}-1$). In addition, the $PRU_{MB}$ is mapped to a permutation PRU ($PPRU_{MB}$) in a miniband permutation process. The $PRU_{SB}$ and the $PPRU_{MB}$ are mapped to at least one frequency partition in a frequency partitioning process.

A frame structure in a wireless communication system introducing a relay station is described below.

The aforementioned frame structures in FIG. 2 can apply between a BS and a macro MS. However, when a wireless communication system includes an RS, it is difficult to apply to the RS the same frame structure applied between the BS and the macro MS. The RS requires a radio resource region for DL transmission with respect to a relay MS connected to the RS. Further, since the RS receives a signal from the relay MS and thereafter decodes and transmits it to the BS, the RS requires a radio resource region for UL transmission. The RS can transmit a signal to an MS connected to the RS or can receive a signal from the BS in the same frequency band. Further, the RS can receive a signal from the MS connected to the RS or can transmit a signal to the BS in the same frequency band. Therefore, the RS requires a transition gap when switching a transmission/reception operation of a signal. In general, it is assumed that the RS cannot transmit or receive a signal in the transition gap.

Figure 5:
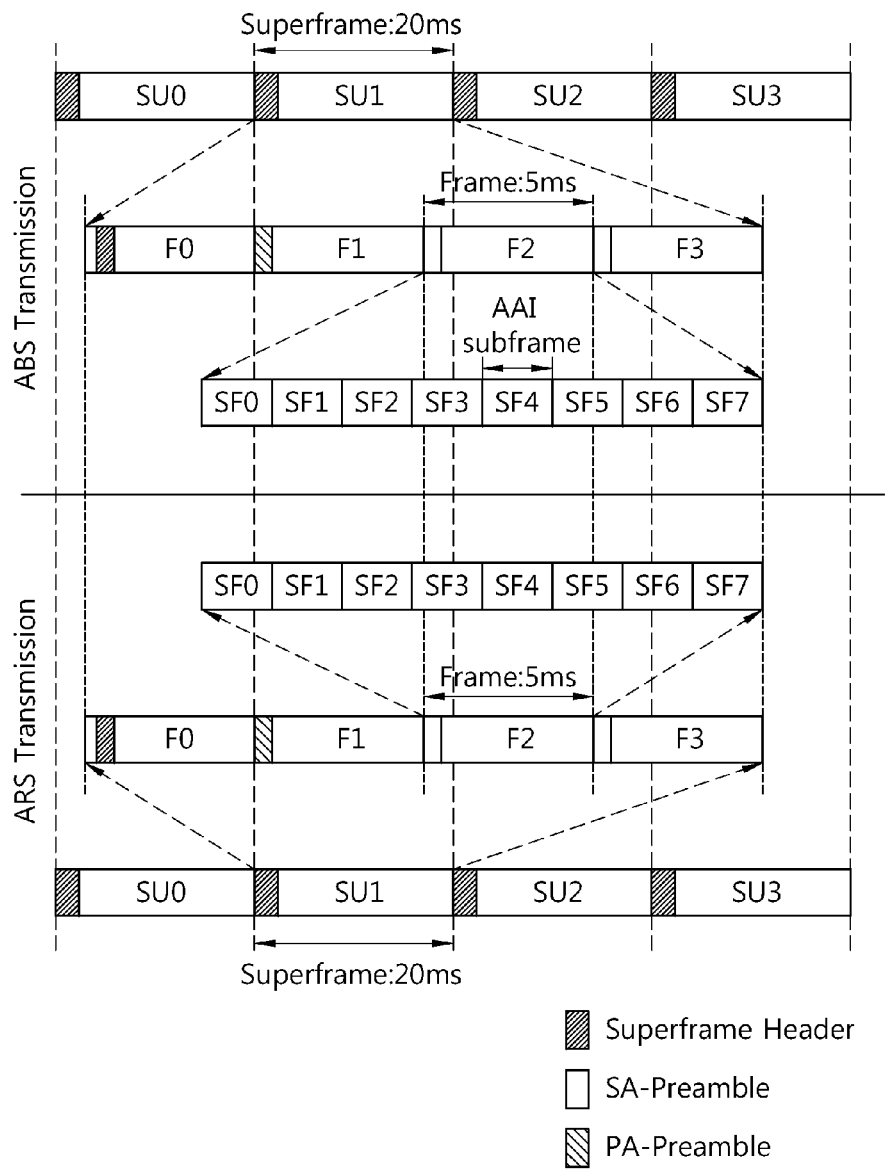
FIG. 5 shows an example of a frame structure of a system including an RS.

FIG. 5 shows an example of a frame structure of a system including an RS.

OFDMA parameters of Table 1 can be directly used in the system including the RS. Superframes of a BS and an MS can be time aligned, and include the same number of frames and subframes. Each RS superframe includes an SFH. An SFH transmitted by the RS has the same location and the same format as an SFH transmitted by the BS. An RS preamble (i.e., SA-preamble and PA-preamble) and a super-ordinate BS preamble are transmitted simultaneously.

The RS conforms to a frame structure of a basic IEEE 802.16m system. In a simultaneous transmit receive (STR) relay, a BS-RS frame structure and an RS-MS frame structure are the same as a BS-MS frame structure. In a time-division transmit and receive (TTR) relay, a BS-RS frame and a MS frame are transmitted by using time division multiplexing. Hereinafter, the TTR relay will be described.

In the system supporting the RS, the BS frame is divided into an access zone and a relay zone. In the frame, the access zone can be located ahead of the relay zone. Alternatively, in the FDD system, the relay zone can be located ahead of the access zone in a UL frame. A duration of the access zone and the relay zone is different between DL and UL. The access zone and the relay zone can be configured by using an AAI_ARS-CONFIG-CMD message transmitted by the BS.

In a BS frame, an access zone consists of a DL access zone and a UL access zone, and a relay zone consists of a DL relay zone and a UL relay zone. The BS frame access zone is used to communicate with only the MS. The BS frame relay zone can be used to communicate with the RS, and can be used to communicate with the MS. In the DL relay zone, the BS transmits a signal to a sub-ordinate RS. In the UL relay zone, the BS receives a signal from the sub-ordinate RS.

In an RS frame, an access zone consists of a DL access zone and a UL access zone, and a relay zone consists of a DL relay zone and a UL relay zone. The RS frame access zone is used to communicate with only the MS. In the DL relay zone, the RS receives a signal from a super-ordinate BS. In the UL relay zone, the RS transmits a signal to the super-ordinate BS.

When the RS or the MS receives a frame configuration index through an S-SFH SP1, DL/UL access and relay zones are configured in a frame.

A relay transmit to receive transition interval (R-TTI) can be inserted in each RS frame. The R-TTI can be inserted for an ARS transmit/receive transition gap (ARSTTG) and a round-trip delay (RTD) between the RS and a super-ordinate station. In addition, a relay receive to transmit transition interval (R-RTI) can be inserted in each RS frame. The R-RTI can be inserted for an ARS receive/transmit transition gap (AR-SRTG) and an RTD between the RS and the super-ordinate station.

Uplink control channels may include a fast feedback channel (FFBCH), a hybrid automatic repeat request (HARQ) feedback channel (HFBCH), a ranging channel, a bandwidth request channel (BRCH), and so on. Information, such as a CQI, an MIMO feedback, ACK/NACK, an uplink synchronization signal, and a bandwidth request, may be transmitted through the uplink control channel. The FFBCH, the HFBCH, the ranging channel, the BRCH, etc. may be located in any place of an uplink subframe or a frame.

An FFBCH carries a CQI and/or MIMO information feedback, and can be divided into two types, i.e., a primary fast feedback channel (PFBCH) and a secondary fast feedback channel (SFBCH). The PFBCH carries 4-bit to 6-bit information, and provides a wideband CQI and/or MIMO feedback. The SFBCH carries 7-bit to 24-bit information, and provides a narrowband CQI and/or MIMO feedback. When the narrowband CQI and/or PMI or the like are fed back through the PFBCH or the SFBCH, a CQI and/or PMI for one subband (best-1) or a plurality of subbands (best-N) having good channel quality can be fed back. The SFBCH can support more control information bits by using a high code rate. The PFBCH supports non-coherent detection which does not use a pilot. The SFBCH supports coherent detection which uses a pilot. The FFBCH starts at a predetermined position. A size of the FFBCH can be defined by a downlink control signal. The FFBCH can be periodically assigned. The number of FFBCHs assigned by a base station (BS) to a user equipment (UE) may be less than or equal to one.

Meanwhile, in general, since the BS and a relay station (RS) seldom move and may be located in a place having good link quality, link quality between the BS and the RS is better than link quality between the BS and the UE. Therefore, when transmitting data by using a multiple-input multiple-output (MIMO) scheme, a closed-loop (CL) MIMO scheme can be used. The CL MIMO scheme is a MIMO scheme in which a radio resource is scheduled by using information regarding channel or link quality fed back to the BS from the UE or the RS. On the other hand, an open-loop (OL) MIMO scheme is a MIMO scheme in which information regarding channel or link quality fed back to the BS from the UE or the RS is not used in scheduling of a radio resource.

At present, when a CQI and/or a PMI are fed back in an IEEE 802.16m system, a measured value is fed back in unit of a subband. One subband includes four contiguous PRUs. Data is assigned also in unit of a subband. Meanwhile, in a system employing an RS, regarding a link of which a channel state is not significantly changed such as a link between a BS and the RS, feedback information can be transmitted more accurately in a case where it is fed back in unit of a PRU than a case where it is fed back in unit of a subband. However, when a different feedback allocation A-MAP information element (IE) or message is used according to the link, a signaling overhead increases. That is, it is difficult to change a feedback transmission mechanism of a resource or the like assigned in feedback transmission. Therefore, there is a need for a method for feedback transmission in unit of a PRU while directly using the conventional feedback transmission mechanism.

Hereinafter, the proposed feedback transmission method will be described according to an embodiment of the present invention.

Figure 6:
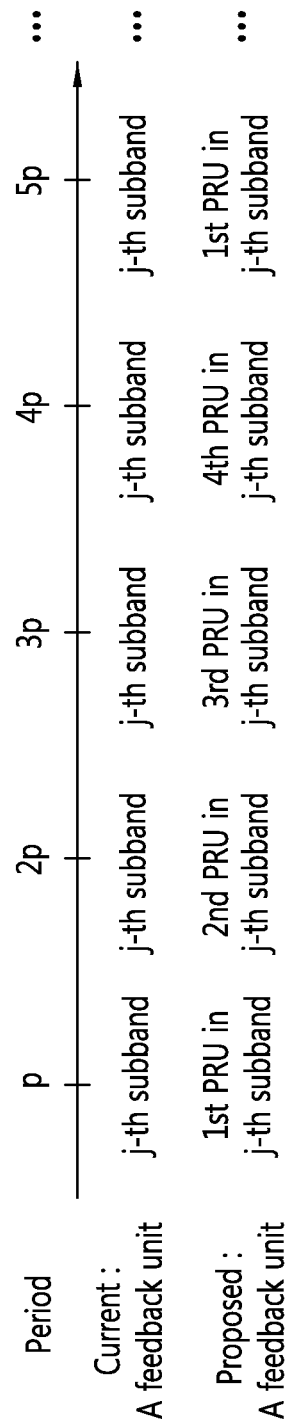
FIG. 6 is an example of the proposed feedback transmission.

FIG. 6 is an example of the proposed feedback transmission.

Referring to FIG. 6, the conventional feedback transmission method transmits measured feedback information in unit of a subband with a period p in a time axis. In comparison thereto, the proposed feedback transmission method transmits measured feedback information in unit of each PRU in a subband with a period 4p in a time axis. That is, feedback information on a $1^{st}$ PRU in a subband, feedback information on a $2^{nd}$ PRU in the subband, feedback information on a $3^{rd}$ PRU in the subband, and feedback information on a $4^{th}$ PRU in the subband are transmitted respectively in a time p, a time 2p, a time 3p, and a time 4p. In a time 5p, the feedback information on the $1^{st}$ PRU in the subband is transmitted again. That is, feedback information for each PRU in the subband is cyclically transmitted with a specific period.

Transmitting of feedback information in unit of a PRU by an RS according to the proposed feedback transmission method can be indicated by an AAI-SCD message. For example, if a value of a 16m_Relay_zone_AMS_allocation-_indicator field in the AAI-SCD message is 0, the RS can cyclically transmit measured feedback information in unit of a PRU when a BS instructs to report a subband PMI.

Alternatively, the BS can determine whether the RS transmits the feedback information in unit of a subband or in unit of a PRU. This can be indicated by a feedback allocation A-MAP IE or an AAI_Single_MIMO-FBK message transmitted by the BS to the RS or a UE. Table 2 is an example of an ARS_Feedback_Mode field newly defined in the feedback allocation A-MAP IE.

TABLE 2

| Syntax | Size (bits) | Notes |
|---|---|---|
| ARS_Feedback_Mode | 1 | 0b0: feedback Subband PMI in unit of subband (normal) <br> 0b1: feedback the PMI of i-th PRU in the subband, which i is cyclic order (1 –>2 –> 3 –>4 –> 1 –>...) |

The ARS_Feedback_Mode field of Table 2 can be applied when a value of a MIMO feedback mode is 3 or 6. The MIMO feedback modes 3 and 6 support a closed loop-single user (CL-SU) in a localized permutation for frequency selective scheduling. If the value of the ARS_Feedback_Mode field is 0, a PMI is fed back in unit of a subband similarly to the conventional method. If the value of the ARS_Feedback_Mode field is 1, a PMI of an $i^{th}$ PRU is cyclically fed back according to the proposed feedback transmission method.

In addition, although it is described in the aforementioned embodiment that feedback information for 4 PRUs in a subband is separately transmitted, feedback information for two PRUs among the feedback information for the four PRUs may be transmitted together. For example, the feedback information for $1^{st}$ and $2^{nd}$ PRUs in the subband may be transmitted in the time p, and the feedback information for $3^{rd}$ and $4^{th}$ PRUs in the subband may be transmitted in the time 2p. In the time 3p, the feedback information for the $1^{st}$ and $2^{nd}$ PRUs in the subband may be transmitted again. Accordingly, feedback information for each PRU may be transmitted with a period of 2p. In this case, there is an advantage in that feedback information for one subframe can be transmitted with a shorter period. In addition, the feedback information is not necessarily configured in unit of a PRU in another embodiment of the present invention, and thus the feedback information can be transmitted in unit of a plurality of mutually exclusive partitions constituting a subband. For example, when one subband consists of 18*4=72 subbands, $1^{st}$, $2^{nd}$, and $3^{rd}$ partitions can respectively consist of 24, 30, and 18 subcarriers, and the feedback information can be transmitted by being configured in unit of each partition.

In addition, although it is described in the aforementioned embodiment that the feedback information for the $1^{st}$ PRU to the feedback information for the $4^{th}$ PRU are transmitted in that order, this is for exemplary purposes only, and thus the present invention is not limited thereto. That is, in order to predict an average CQI or average PMI value of a whole subband more promptly, feedback information can be transmitted in the PRU order of 1->3->2->4 or 2->4->1->3.

Figure 7:
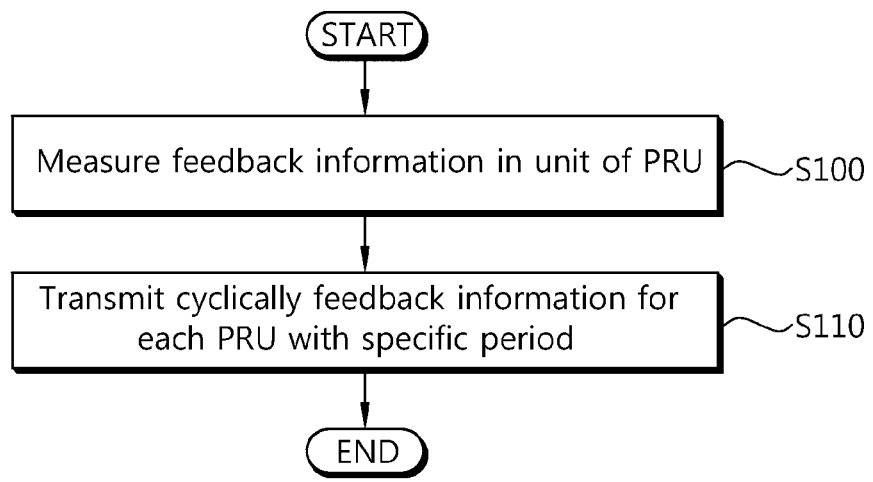
FIG. 7 shows another embodiment of the proposed feedback information transmission method.

FIG. 7 shows another embodiment of the proposed feedback information transmission method. In step S100, an RS measures feedback information in unit of a PRU. The feedback information may be a CQI or a PMI. In step S110, the RS cyclically transmits the measured feedback information for each PRU with a specific period.

Figure 8:
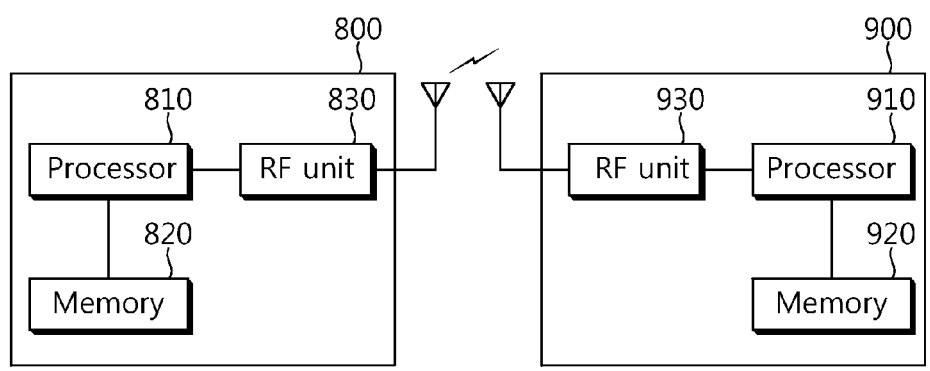
FIG. 8 is a block diagram showing a BS and an RS according to an embodiment of the present invention.

FIG. 8 is a block diagram showing a BS and an RS according to an embodiment of the present invention.

A BS 800 includes a processor 810, a memory 820, and a radio frequency (RF) unit 830. The processor 810 implements the proposed functions, procedures, and methods. Layers of a radio interface protocol can be implemented by the processor 810. The memory 820 is coupled to the processor 810 to store a variety of information for driving the processor 810. The RF unit 830 is coupled to the processor 810 to transmit and/or receive a radio signal and to transmit the feedback allocation A-MAP IE.

An RS 900 includes a processor 910, a memory 920, and an RF unit 930. The processor 910 implements the proposed functions, procedures, and/or methods. The processor 910 measures feedback information in unit of a PRU. Layers of a radio interface protocol can be implemented by the processor 910. The memory 920 is coupled to the processor 910 to store a variety of information for driving the processor 910. The RF unit 930 is coupled to the processor 910 to cyclically transmit measured feedback information for each PRU with a specific period.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting feedback information by a relay station in a wireless communication system employing the relay station, the method comprising:
   receiving a feedback allocation advanced-MAP information element (IE) from a base station;
   measuring the feedback information in a unit of each partition by dividing a subband into a plurality of partitions, wherein each partition is one physical resource unit (PRU) including 18 subcarriers; and transmitting alternately the measured feedback information for each partition according to a specific period, wherein a unit of feedback measurement is determined by an ARS_Feedback_Mode field in the feedback allocation A-MAP IE, wherein if a value of the ARS_Feedback_Mode field has '1', the measured feedback information is transmitted in the unit of the PRU, wherein if a value of the ARS_Feedback_Mode field has '0', the measured feedback information is transmitted in the unit of the subband, wherein the value of the ARS_Feedback_Mode field is applied when a value of feedback mode is a specific value that supports a closed loop-single user (CL-SU) in a localized permutation for frequency selective scheduling, wherein the feedback information for two PRUs among the feedback information for four PRUs are transmitted together within a specific time period, and wherein the feedback information for each partition is cyclically and alternately transmitted in the order of the subband such that the feedback information for a fourth PRU is transmitted after transmission of the feedback information for a second PRU, which was transmitted after the transmission of the feedback information for a third PRU, which was transmitted after the transmission of the feedback information for a first PRU.

2. The method of claim 1, wherein the feedback information includes at least one of a channel quality indicator (CQI) and a precoding matrix indicator (PMI).

3. The method of claim 1, wherein a unit of feedback measurement is determined by a message transmitted by the relay station.

4. An apparatus for transmitting feedback information, the apparatus comprising:
a processor configured to receive a feedback allocation advanced-MAP information element (IE) from a base station, and to measure the feedback information in a unit of each partition of a plurality of partitions constituting a subband, wherein each partition is one physical resource unit (PRU) including 18 subcarriers; and
a radio frequency (RF) unit coupled to the processor and configured to alternately transmit the measured feedback information for each partition according to a specific period, wherein a unit of feedback measurement is determined by an ARS_Feedback_Mode field in the feedback allocation A-MAP IE, wherein if a value of the ARS_Feedback_Mode field has '1', the measured feedback information is transmitted in the unit of the PRU, wherein if a value of the ARS_Feedback_Mode field has '0', the measured feedback information is transmitted in the unit of the subband, wherein the value of the ARS_Feedback_Mode field is applied when a value of feedback mode is a specific value that supports a closed loop-single user (CL-SU) in a localized permutation for frequency selective scheduling, wherein the feedback information for two PRUs among the feedback information for the four PRUs are transmitted together within a specific time period, and wherein the feedback information for each partition is cyclically and alternately transmitted in the order of the subband such that the feedback information for a fourth PRU is transmitted after transmission of the feedback information for a second PRU, which was transmitted after the transmission of the feedback information for a third PRU, which was transmitted after the transmission of the feedback information for a first PRU.

5. The method of claim 4, wherein the feedback information includes at least one of a channel quality indicator (CQI) and a precoding matrix indicator (PMI).

6. The apparatus of claim 4, wherein the RF unit is further configured to receive a feedback allocation advanced-MAP information element (IE) from a base station.

* * * * *